Figure 1:
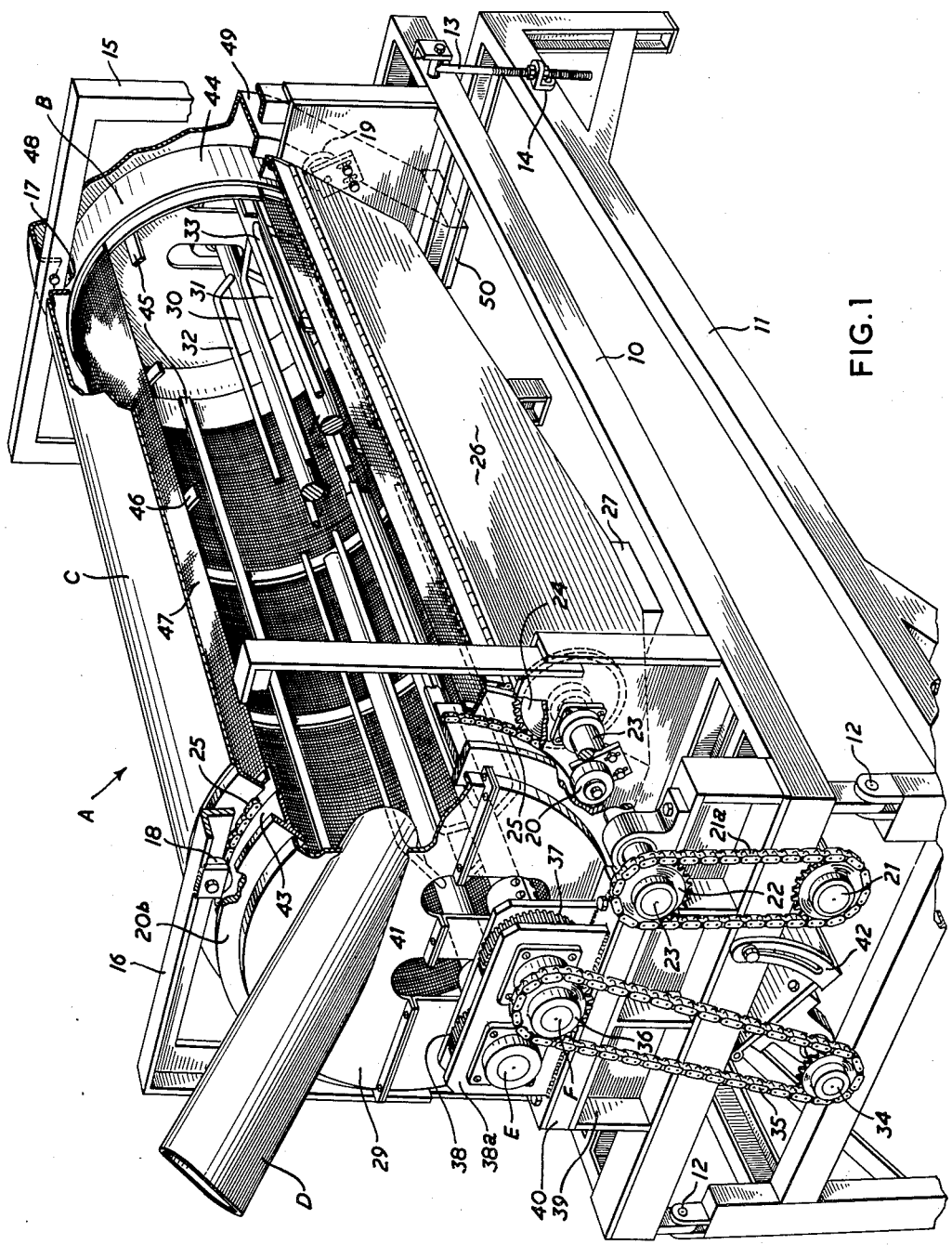

Feb. 13, 1962 J. D. CHRISTIAN 3,021,008
APPARATUS FOR CLEANING AND GRADING ASBESTOS
Filed March 23, 1960 2 Sheets-Sheet 1

INVENTOR
JOHN D. CHRISTIAN
BY Featherstonhaugh & Co.
ATTORNEYS

INVENTOR
JOHN D. CHRISTIAN
BY Featherstonhaugh & Co.
ATTORNEYS

United States Patent Office 3,021,008
Patented Feb. 13, 1962

3,021,008
APPARATUS FOR CLEANING AND
GRADING ASBESTOS
John D. Christian, Toronto, Ontario, Canada, assignor to Cassiar Asbestos Corporation Limited, Toronto, Ontario, Canada
Filed Mar. 23, 1960, Ser. No. 17,082
3 Claims. (Cl. 209—299)

This invention relates to a method and apparatus for cleaning and grading asbestos.

In the cleaning and grading of asbestos fibres, the objective is to obtain fibres graded as to length. Up to the present time, this grading has largely been carried out by use of flat shaker screens and to a lesser extent, by using rotary trommels. In the first case, the screens required result in bulky apparatus which is extremely heavy, costly, and promotes vibration of the building in which they are situated and require a great deal of floor space. Moreover, such flat screens are subject to "blinding," i.e. clogging, and require frequent cleaning, which of course results in stoppages as well as screen wear. In the second case, trommels—inclined cylindrical rotating screens in which the material is subjected to tumbling—will not in terms of comparative screen area operate as efficiently as flat screens and they are likewise subject to "blinding." In both cases the grade of product is not as good.

These disadvantages are largely eliminated by the apparatus of the present invention which, in terms of screen area, have approximately three times the capacity of the flat screen apparatus to do the same work while taking up approximately one-quarter of the space, consuming about fifty percent less power and involving approximately fifty percent less weight whereas the difficulty of "blinding" and work stoppage as well as screen wear is greatly reduced. Due to increased efficiency of the screen, either smaller screen meshes may be used to remove the same quantity of dust and shorts and at the same time retain a higher percentage of the desired fibres, or similar screen meshes may be used with increased rates of speed to produce comparable results, so that fibre may be cleaned and graded to a quality much above that possible with the previous equipment above referred to. In five months of test work employing the apparatus of the present invention, no "blinding" or screen wear has been apparent.

The invention generally comprises the use of a rotatable cylindrical screen incorporating therewithin a pair of beaters rotated in opposite directions, one of which is rotated in the direction of rotation of the screen which latter is disposed at an incline and, through the medium of rotating spaced apart inter-meshing beaters combined with said rotatable screen, the clumps of fibre are caused to break up, as to free the shorts and dust, and throw the fibre with substantial force against the screen surface so that by continual repetition of this action, new surfaces of the fibre are exposed to the screen which, due to its rotating action, ensures that continuously new and clean screening cloth is available for screening and that all the fibre is thoroughly mixed and receives uniform treatment.

The invention will be fully understood by reference to the following detailed specification taken in conjunction with the accompanying drawings, in which, FIG. 1 is a fragmentary perspective view of the screening apparatus of the present invention showing a practical arrangement of cooperative parts operatively arranged to perform the improved screening functions of the present invention.

Figure 2:
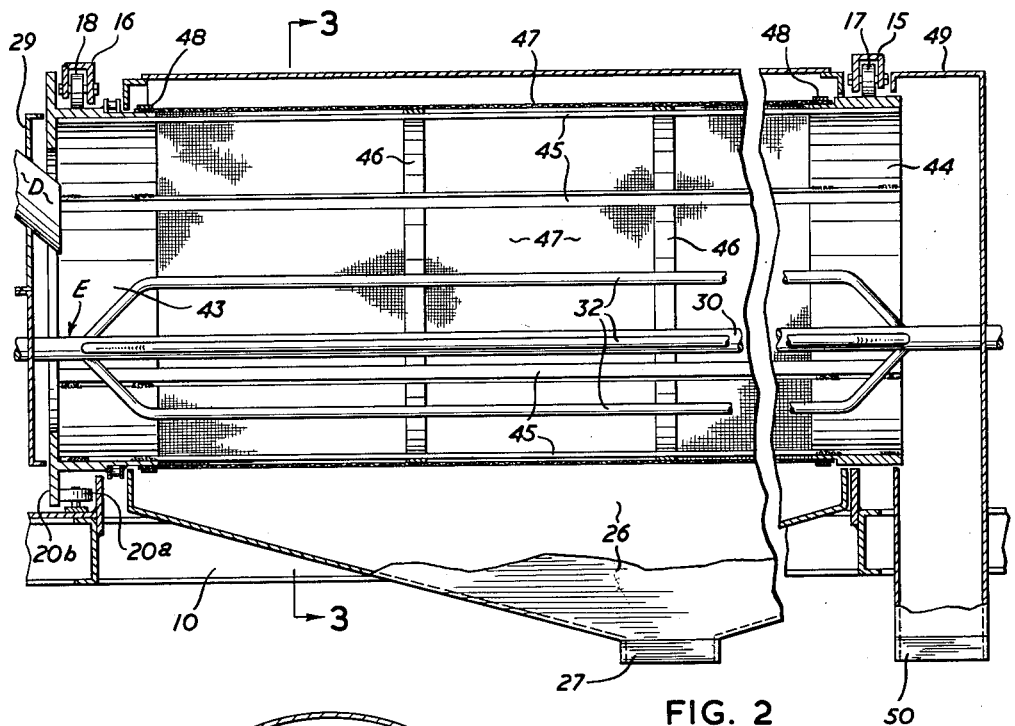
Figure 3:
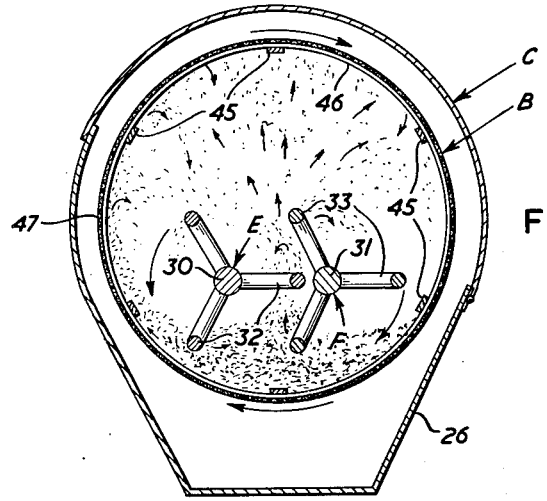

FIG. 2 is a longitudinal section taken through the apparatus disclosed in FIG. 1; and FIG. 3 is a transverse section taken substantially along the line 3—3 of FIG. 2.

Referring to the drawings, and particularly to FIG. 1 in the first instance, A indicates the apparatus as a whole which incorporates a rotary screen supporting frame 10 adjustably mounted on the framework base 11 as by pivoting frame 10 at 12 from one end thereof, and supporting it at the other end by the pivotally mounted screw-threaded adjusting shafts 13, screw-threadedly engaged with the brackets 14 on the base supporting frame 11 whereby the inclination of the screen supported by frame 10 may be adjusted to the required degree. The rotary cylindrical screen unit B is rotatably supported on frame 10 by means of a super-structure comprised of the end frames 15 and 16, respectively, which carry the bearing rollers 17 and 18, respectively, which in conjunction with other bearing rollers suitably mounted, such as the rollers 19 and 20 mounted in pairs, serve to engage suitable roller bearing tracks disposed at the ends of the framework for permitting rotatable support of the screen unit B. The rotatable support of the screen also includes end thrust roller 20a engaging flange 20b.

The screen unit B is driven through a suitable power source effecting rotation of the drive shaft 21 through its driving sprocket which meshes with the drive chain 21a in turn driving the sprocket 22 of driven shaft 23 which is supported in suitable bearings on the sub-framework and which in turn drives the gear 24 keyed thereto and which meshes with the fixed chain gear 25 rigidly carried by one end of the screen unit B. The screen unit B is enclosed within the casing C, the lower part of which is formed as a receiver 26 for the screened material having a suitable control discharge member 27 through which the screen material is discharged in suitable manner. The screen unit C is fed through the feeding conduit D which passes through an end enclosure 29 of screen unit C and which connects the screen unit with a suitable hopper or other feed for supplying the raw product to be screened.

Within the rotary screen unit B, the twin beaters, generally designated by the letters E and F, are disposed in cooperative rotatable relation. These beaters are generally comprised by the shafts 30 and 31, respectively, which extend longitudinally throughout the length of the screen unit C and carry a plurality of beater bars 32 and 33, respectively, for each shaft which preferably may constitute three or four in number radially arranged in respect to each shaft and designed in effect to inter-mesh with each other as each shaft 32 and 33 rotate in opposite directions to one another. These beaters are disposed more closely adjacent to the bottom of screen unit than to the top as is clear from a consideration of FIG. 3, and their height is suitably adjustable to meet desired requirements in any suitable manner.

The beaters E and F are preferably rotated by means of a power source separate to that driving the screen unit B and which rotates the beater driving shaft 34 carrying a driving sprocket which meshes with the drive chain 35 and which in turn operates the driven sprocket 36 carried by beater shaft F. Beater shaft E is in turn driven by means of a suitable gear 37 carried by beater shaft F which in turn is designed to mesh with the gear 38 carried by beater shaft E so that as a result, the beaters E and F are rotated in opposite directions. These shafts are journalled in a suitable bearing supporting block 38a mounted on the sub-frame 39 and which by means of a removable shim 40 may be elevated or lowered as required to set the spacing of shafts E and F in relation to the bottom of screen unit B, or to change their inclination in respect to the screen unit B as may be desired, it being understood that the opposite ends of shafts E and F are likewise supported. The end plates 29 of the housing surrounding screen unit B are provided with the twin vertically arranged slots 41 for passage therethrough of shafts 30 and 31 of beaters E and F and which accordingly permit of vertical adjustment of these shafts as may be required. Adjustment of the drive chain for shaft 31 of beater F may be accomplished in any suitable simple way such as by means of the slotted quadrant bracket 42 attached to the mounting plate carrying the bearing of drive shaft 34.

The screen unit C may be formed from any simple suitable framework basically constituted by the cylindrical end rings 43 and 44 (FIG. 2) having the radially spaced apart longitudinally extending frame bars 45 and intervening rings or hoops 46, all of which may be welded or otherwise secured to form a framework over which the screen 47 is fitted and secured at the ends by suitable rings 48. At the discharge end of the cylindrical screen unit C, the housing includes a suitable casing 49 forming a reservoir with a discharge outlet 50 for receiving from the screen unit, unscreened material.

In operation, the screen unit B is disposed at an incline to the horizontal on its framework with the feed end (at the left as viewed in FIG. 2) being raised relatively to the opposite discharge end so that the feed introduced at the drum unit via the feeding conduit D, at a predetermined rate, will build up on the base of the screen along its length to a depth higher than the lowermost reach of the beater bars 32 and 33. The beaters 30 and 31 are rotated at approximately 380 r.p.m., beater 31 in a clockwise direction and beater 30 in a counter-clockwise direction, while the drum unit is rotated at approximately 12 r.p.m. in a clockwise direction. Alternatively, of course, the direction of rotation of these rotary elements could be reversed. In result, therefore, the beaters have the effect of lifting the feed from the bed upwardly between the beaters and of throwing said material forcefully upwardly and outwardly against the drum surface as to rapidly break up said material into screenable fibres. This breaks up the lumps of fibre, freeing the shorts and the dust and by repeating this action exposes continually new surfaces of the fibre to the screen. The rotating screen ensures that continual new and clean screening cloth is available for screening and that all the fibre is thoroughly mixed and receives uniform treatment. In this way, the remarkably improved results have been achieved over prior methods and smaller screen meshes may be used to remove the same quantity of dust and shorts while at the same time retaining a higher percentage of the desired fibres. Alternatively, similar screen meshes may be used as in the past but with increased rates of speed to produce comparable results and the fibre can be cleaned and graded to a quality much above that possible with previous conventional equipment. In five months of test work, no blinding or screen wear was encountered.

By comparison with conventional flat screen equipment and using the same screen mesh, the apparatus of the present invention with 45% greater feed rate removed 20.6% as compared to 16.5% of shorts and dust. The thrus were a little higher quality indicating that equal qualities and quantities can be removed at approximately 50% greater rate of feed. Comparable areas of screen cloth were, in the case of the present invention, 24 square feet as against 50 square feet in the conventional flat screen, illustrating three times greater efficiency per square foot of cloth in favor of the apparatus of the present invention as compared to the conventional flat screen equipment. A comparison between the results of the present invention and those obtained on the conventional flat screen heretofore generally used is given in the following Tables 1 to 3, wherein the present invention is designated as the T.E.C. rotary screen and the prior art practice as the flat screen:

TABLE #1

*T.E.C. rotary versus #13 Hall screen—"AK" fibre*

| No. 13 Hall Screen | T.E.C. Rotary Screen | | | | Test Run | Conventional Flat Screen | | | T.E.C. Rotary Screen | | |
|---|---|---|---|---|---|---|---|---|---|---|---|
| | Beater Speed | Drum Speed | Type of Beaters | Screen | | Overs | Thrus | Rate of Feed | Overs | Thrus | Rate of Feed |
| 14 Mesh Screen Cloth | 380 R.P.M. | 12 R.P.M. | Set of two Each Four Arms-Round 5⅝" Diam. | 14 Mesh | Lot # 301 | 144 lbs. 6 oz. = 93.4% | 28 lbs. 10 oz. = 16.6% | (15 min.) = 692 lbs./hr. | 119 lbs. = 79.4% | 31 lbs. = 20.6% | (9 min.) = 1,000 lbs./hr. |
| | | | Set of Two Beaters—each consisting of Four Arms—FLAT | 20 Mesh | Lot # 302 | 279 lbs. = 86.9% | 42 lbs. = 13.1% | (15 min.) = 1,284 lbs./hr. | 134 lbs. = 74.4% | 46 lbs. = 25.6% | (8 min. 20 sec.) = 1,297 lbs./hr. |
| | | | | 24 Mesh | Lot # 303 | 280.5 lbs. = 84.6% | 51 lbs. = 15.4% | (12½ min.) = 1,490 lbs./hr. | 110 lbs. = 78.6% | 30 lbs. = 21.4% | (5 min.) = 1,680 lbs./hr. |
| | | | | | Lot # 304 | 248 lbs. = 83.2% | 18 lbs. = 6.8% | (4 min.) = 3,990 lbs./hr. | 219 lbs. = 90.4% | 21 lbs. = 9.6% | (3 min. 45 sec.) = 3,504 lbs./hr. |
| | | | | | Lot # 305 | 193 lbs. = 88.9% | 24 lbs. = 11.1% | (8 min.) = 1,628 lbs./hr. | 192 lbs. = 87.3% | 28 lbs. = 12.7% | (7½ min.) = 1,760 lbs./hr. |
| | Average of 4 Tests (Lots #302–305) | | | | | | 11.6% | 2,123 lbs./hr. | | 17.3% | 2,060 lbs./hr. |

TABLE #2

| Test | Sample | | Length, Inch | Percent 1/16" | −8 Mesh | −200 Mesh |
|---|---|---|---|---|---|---|
| Lot # 301 | Flat Screen | Heads | .126 | 64.7 | 29.0 | 23.0 |
| | | Thrus | .077 | 88.2 | 13.0 | 39.2 |
| | | Overs | .136 | 56.4 | 29.3 | 19.7 |
| | | Calcul. Overs | .136 | 60.0 | 32.2 | 19.8 |
| | TEC Screen | Heads | .126 | 64.7 | 29.0 | 23.0 |
| | | Thrus | .083 | 84.4 | 13.7 | 34.1 |
| | | Overs | .29 | 59.9 | 29.4 | 18.8 |
| | | Calcul. Overs | .137 | 59.6 | 33.0 | 20.1 |
| Lot # 302 | Flat Screen | Heads | .125 | 67.1 | 28.9 | 29.5 |
| | | Thrus | .074 | 80.8 | 11.4 | 42.7 |
| | | Overs | .133 | 61.9 | 30.6 | 27.0 |
| | | Calcul. Overs | .133 | 63.5 | 31.6 | 27.5 |
| | TEC Screen | Heads | .125 | 67.1 | 28.9 | 29.5 |
| | | Thrus | .075 | 90.2 | 12.0 | 46.1 |
| | | Overs | .127 | 62.7 | 34.5 | 24.3 |
| | | Calcul. Overs | .142 | 59.2 | 34.8 | 23.8 |
| Lot # 303 | Flat Screen | Heads | .119 | 67.7 | 18.8 | 46.7 |
| | | Thrus | .069 | 94.9 | 7.5 | 54.6 |
| | | Overs | .117 | 68.6 | 21.0 | 43.8 |
| | | Calcul. Overs | .128 | 62.8 | 20.9 | 45.3 |
| | TEC Screen | Heads | .119 | 67.7 | 18.8 | 46.7 |
| | | Thrus | .069 | 95.1 | 5.6 | 67.3 |
| | | Overs | .114 | 70.5 | 23.5 | 40.3 |
| | | Calcul. Overs | .133 | 60.3 | 22.4 | 41.1 |
| Lot # 304 | Flat Screen | Heads | .140 | 57.8 | 40.1 | 13.9 |
| | | Thrus | .066 | 97.5 | 12.9 | 38.0 |
| | | Overs | .132 | 59.3 | 35.8 | 14.8 |
| | | Calcul. Overs | .145 | 55.0 | 42.1 | 12.2 |
| | TEC Screen | Heads | .139 | 59.5 | 36.8 | 13.2 |
| | | Thrus | .071 | 93.0 | 11.0 | 44.5 |
| | | Overs | .135 | 59.4 | 41.3 | 13.2 |
| | | Calcul. Overs | .146 | 56.0 | 39.6 | 9.9 |
| Lot # 305 | Flat Screen | Heads | .144 | 56.7 | 35.0 | 22.5 |
| | | Thrus | .067 | 96.5 | 10.9 | 40.6 |
| | | Overs | .132 | 62.0 | 38.5 | 20.4 |
| | | Calcul. Overs | .154 | 51.8 | 38.0 | 20.3 |
| | TEC Screen | Heads | .126 | 59.8 | 34.8 | 24.6 |
| | | Thrus | .074 | 90.8 | 14.4 | 48.9 |
| | | Overs | .161 | 52.4 | 36.8 | 20.4 |
| | | Calcul. Overs | .134 | 55.3 | 37.7 | 21.1 |

TABLE #3

*Average of 4 Tests (Lots #302–305, incl.)*

| Test | Sample | Length, inch | Percent 1/16" | −8 Mesh | −200 Mesh |
|---|---|---|---|---|---|
| Flat Screen | Head Sample | .132 | 62.3 | 30.7 | 28.2 |
| | Thrus | .069 | 94.9 | 10.7 | 44.0 |
| | Overs | .129 | 63.0 | 31.5 | 26.5 |
| | Calcul. Overs | .140 | 58.3 | 33.2 | 26.3 |
| TEC Screen | Head Sample | .127 | 63.5 | 29.8 | 28.5 |
| | Thrus | .072 | 92.3 | 10.8 | 51.7 |
| | Overs | .134 | 61.3 | 34.0 | 24.6 |
| | Calcul. Overs | .139 | 57.7 | 33.6 | 24.0 |

A consideration of Table #1 indicates that using the same screen mesh as conventional equipment, the T.E.C. screen, with 45% greater feed rate, removed 20.6% vs. 16.6% of shorts and dust. These throughs were a little higher quality, indicating that equal qualities and quantities can be removed at approximately 50% greater rate of feed. The comparable areas of screen cloth were T.E.C. 24 sq. ft. vs. conventional 50 sq. ft. The T.E.C. screen is, therefore, three times as efficient per square foot of cloth as conventional equipment A consideration of Table #2 in respect of quality shows that using the average of lots 302 to 305 inclusive, which were run at the same feed rates, and with 24 mesh screens on the T.E.C. vs. 14 mesh on the conventional, the T.E.C. screen removed 17.3% vs. 11.6% of shorts and dust. These throughs contained 7.7% more −200 mesh dust, and were the equivalent in other respects to the conventional screen throughs.

A consideration of Table #3 illustrates that the overs or final product increased in average length to .134" vs. .129" with lower short (1/16") content—61.3 vs. 63.0. The Bauer-McNett or wet screen analysis confirmed the above results, showing increased length (−8 mesh)— 34.0 vs. 31.5, and a lower dust content (−200 mesh) 24.6 vs. 26.5.

The advantageous results of the present invention are, therefore, clearly evident from the foregoing resulting in substantially increased capacity, a product having a quality much above that possible with previous equipment, with apparatus which consumes about 50% less power involving approximately 50% less weight, while taking up approximately one quarter of the space previously required by the flat screen method, whereas difficulty of blinding and work stoppage as well as screen wear is greatly reduced. The invention makes it possible to employ smaller screen meshes to remove the same quantity of dust and shorts while retaining a higher percentage of desired fibres or similar screen meshes may be used with increased rates of feed to produce comparable results.

What I claim as my invention is:

1. Apparatus for screening asbestos fibres comprising an inclined rotatably supported cylindrical screen, means for introducing asbestos fibre concentrate therewithin, to form a moving bed along the bottom of said screen, means for rotating said screen, a pair of beaters extending longitudinally through the interior of said cylindrical screen and below the centre longitudinal axis thereof, said beaters having a plurality of radially spaced apart beater elements, said beaters when mounted having said beater elements disposed in staggered relation to those of the other and capable of interlapping the beater elements of each other in spaced apart relation to one another when said beaters are rotated, said beater elements being capable of entering said bed of fibre concentrate, and means for rotating said beaters in opposite directions to one another to cause upward movement of fibre concentrate between said beaters and to forcefully discharge said concentrate upwardly and radially outwardly against said screen, and means for rotating said screen.

2. Apparatus for screening asbestos fibres comprising a cylindrical screen, means for rotatably supporting said screen at an incline to the horizontal to provide a feeding end raised above the opposite discharging end thereof, a plurality of beaters rotatably mounted to extend within said screen parallel to one another and parallel to and below the central longitudinal axis of said screen, said beaters having beating elements thereon, said elements of one beater being disposed in staggered relationship to those of an adjacent beater when mounted in side by side relationship and capable of interlapping the elements of an adjacent beater in spaced apart relation to one another, means for feeding asbestos fibre concentrate to said screen at the feeding end thereof to form a moving bed of fibre concentrate along the bottom of said screen, means for rotating said adjacent beaters at substantial speed and in opposite directions to one another as to lift asbestos concentrate from said bed inwardly and upwardly between said beaters and discharge it forcefully radially outwardly against said screen, means for rotating said screen at a lower rate than said beaters, means for collecting fibres passing through said screen, and means for collecting unscreened fibres at the discharge end of said screen.

3. Apparatus for screening asbestos fibres as claimed in claim 2 in which the beaters comprise a plurality of shafts extending longitudinally within the screen from one end to the other and the beater elements comprise a plurality of longitudinally extending circumferentially spaced apart beater bars connected to said shafts and disposed in radially spaced apart relation thereto.

References Cited in the file of this patent

UNITED STATES PATENTS

| | | | |
|---|---|---|---|
| 233,829 | Adt | Nov. 2, | 1880 |
| 728,759 | Pillmore et al. | May 19, | 1903 |
| 796,794 | Bauer | Aug. 8, | 1905 |
| 957,646 | Boughton | May 10, | 1910 |
| 1,837,782 | Little | Dec. 22, | 1931 |
| 2,536,054 | Harrington | Jan. 2, | 1951 |
| 2,543,537 | Smith | Feb. 27, | 1951 |